United States Patent
Curry et al.

(10) Patent No.: US 8,726,337 B1
(45) Date of Patent: May 13, 2014

(54) COMPUTING WITH PRESENTATION LAYER FOR MULTIPLE VIRTUAL MACHINES

(75) Inventors: Samuel Curry, North Andover, MA (US); Daniel Schiappa, Bedford, NH (US)

(73) Assignee: EMC Corporation, Hopkinton, MA (US)

( * ) Notice: Subject to any disclaimer, the term of this patent is extended or adjusted under 35 U.S.C. 154(b) by 230 days.

(21) Appl. No.: 13/249,481

(22) Filed: Sep. 30, 2011

(51) Int. Cl.
*H04L 29/06* (2006.01)

(52) U.S. Cl.
USPC .............. 726/1; 713/168; 726/23; 726/24; 726/26; 718/1; 718/104

(58) Field of Classification Search
USPC .......... 713/168; 726/23, 24, 26, 1; 718/1, 104
See application file for complete search history.

(56) References Cited

U.S. PATENT DOCUMENTS

| | | | |
|---|---|---|---|
| 7,493,654 B2 * | 2/2009 | Bantz et al. ............... | 726/4 |
| 8,209,408 B1 * | 6/2012 | Huang et al. .............. | 709/223 |
| 8,332,632 B2 | 12/2012 | Iftode et al. | |
| 8,341,756 B2 * | 12/2012 | Kohavi et al. ............. | 726/27 |
| 8,387,048 B1 * | 2/2013 | Grechishkin et al. ...... | 718/1 |
| 8,407,345 B2 * | 3/2013 | Lim .......................... | 709/225 |
| 8,413,141 B2 * | 4/2013 | Branson et al. ............ | 718/1 |
| 2002/0029208 A1 * | 3/2002 | Josephson .................. | 707/1 |
| 2007/0127348 A1 * | 6/2007 | Ooi et al. .................. | 369/112.02 |
| 2008/0127348 A1 * | 5/2008 | Largman et al. .......... | 726/24 |
| 2009/0007100 A1 * | 1/2009 | Field et al. ................ | 718/1 |
| 2011/0145820 A1 * | 6/2011 | Pratt et al. ................. | 718/1 |
| 2012/0198514 A1 | 8/2012 | McCune et al. | |

FOREIGN PATENT DOCUMENTS

WO 2007/087558 A2 8/2007

OTHER PUBLICATIONS

"Protect Sensitive Data on Laptops—Even for Disconnected Users," Citrix, White Paper, dowloaded from http://www.intel.com/content/dam/www/public/us/en/documents/white-papers/citrix-xenclient-virtualization-security-paper.pdf, dowloaded on Feb. 13, 2013.

* cited by examiner

*Primary Examiner* — Mohammad A Siddiqi
(74) *Attorney, Agent, or Firm* — BainwoodHuang

(57) ABSTRACT

An improved technique for managing multiple virtual machines includes a presentation layer that receives user input for multiple virtual machines and renders output from the virtual machines in a unified presentation, which can be displayed to a user. In certain examples, Red/Green security is implemented by designating one virtual machine as a Green virtual machine and another as a Red virtual machine. Although different virtual machines are used, the presentation layer unifies the user's interaction with the virtual machines and reduces the need for the user to keep track of different virtual machines or to switch manually between them.

22 Claims, 4 Drawing Sheets

COMPUTING WITH PRESENTATION LAYER FOR MULTIPLE VIRTUAL MACHINES

BACKGROUND

Red/Green security provides a technique for protecting sensitive data and keeping computers and networks secure. In a conventional Red/Green security scheme, one computer is designated as a Green computer and another computer is designated as a Red computer. The Green computer is a trusted system. It has generally been verified to be free of viruses and other malware. To maintain its trusted status, the Green computer is generally limited to known-safe operations and networks. For example, in some arrangements, the Green computer may be prohibited from connecting to the Internet and may be allowed to visit only a limited set of locations on an isolated network. In other arrangements, the Green computer is allowed to connect to the Internet but is limited to visiting only a designated set of websites. The Green computer is also generally limited to particular applications and may prohibit users from installing new applications.

In contrast, the Red computer is not trusted. It is permitted to perform a much wider range of activities than the Green computer. These include visiting most websites and installing and running applications that have not been verified as safe. The Red computer is assumed to be compromised and is therefore isolated from any Green computers to prevent the flow of information (including malware) between Red computers and Green computers. Users of computers protected by Red/Green security are generally required to switch between a Green computer for trusted activities and a Red computer for untrusted activities.

Originally, Red/Green security was implemented with physically separate computers. More recently, Red/Green security has been realized with virtual machines. In one scheme, one virtual machine of a computer is operated as a Red machine and another virtual machine of the same computer is operated as a Green machine. The conventional rules for Red/Green security are then applied to the virtual machines.

SUMMARY

As is known, "virtual machines" are software realizations of computers that execute programs like physical machines. Multiple virtual machines can be run concurrently on a single physical machine; they can also be moved among different physical machines. Each virtual machine typically appears to users to be its own complete computer.

The use of different virtual machines running on a single physical computer reduces the hardware requirements of Red/Green security from two computers to one. Unfortunately, however, operating two virtual machines can cause inconvenience. Users are often required to switch manually from one virtual machine to another. In addition, a user who regularly switches between Red and Green virtual machines can lose track of which machine is being used at any given time, resulting in confusion.

An improved technique for managing multiple virtual machines overcomes the inconvenience and confusion associated with the prior implementations by providing a presentation layer that receives user input for multiple virtual machines and renders output from the virtual machines in a unified presentation, which can be displayed to a user. In certain examples, Red/Green security is implemented by designating and provisioning one virtual machine as a Red virtual machine and another as a Green virtual machine. The Red and Green virtual machines are then managed to ensure proper operation of Red/Green security. Although different virtual machines are used, the presentation layer unifies the user's interaction with the virtual machines and therefore reduces or avoids the need for the user to keep track of different virtual machines or to switch between them.

In certain embodiments, the presentation layer renders a view of a user application that can be shown on a display of a physical machine. A "user application" is an application that a user can install on a computer, such as a browser, email program, client-server program, or any type of program, including modified versions of commercial programs and custom-made programs. The "view" of the user application, or "application view," is a depiction of the user application as it appears when it is run, e.g., the appearance of the application's GUI (Graphical User Interface), or a substantial facsimile thereof.

In some embodiments, the user provides input to the user application via the presentation layer, such as by entering text into a field shown in the application view, for example. Each user input indicates a computing action to be performed (e.g., open a certain web page or copy a certain file). In response to the entry of user input (e.g., when the user presses "enter" or otherwise confirms the submission of input), the user input is transferred to a first virtual machine for processing. The first virtual machine then processes the user input. Processing generally involves running the application shown in the application view rendered by the presentation layer, with the user input provided as input to the user application running on the first virtual machine. The presentation layer then receives output from the first virtual machine. The output generally includes the user application's response to the processed user input. The presentation layer renders the output from the first virtual machine for presentation on the display of the physical machine.

The user thereafter provides another input to the user application via the presentation layer. In this instance, however, the user input is transferred to a second virtual machine for processing. The second virtual machine processes the user input, generally by running the user application shown in the application view rendered by the presentation layer, with the user input provided as input to the user application running on the second virtual machine. The presentation layer then receives output from the second virtual machine, in response to the user input, and renders the output for presentation on the display of the physical machine.

The presentation layer therefore serves as a single point of input and output for multiple virtual machines. The presentation layer receives application inputs for multiple virtual machines and unifies application outputs from the virtual machines. Confusion and inconvenience associated with switching between different virtual machines is therefore reduced or avoided.

In certain embodiments, the presentation layer is used in conjunction with a policy engine. The policy engine enacts a policy for selecting one of multiple virtual machines for handling each user input entered on the presentation layer. As stated, each user input specifies a computing action to be performed. In one example, the policy engine is configured for distinguishing trusted (Green) computing actions from untrusted (Red) computing actions. The policy engine directs trusted computing actions to a Green virtual machine, whereas it directs untrusted computing actions to a Red virtual machine. In other examples, the policy engine enacts policies that distinguish between other categories of computing actions, such as those involving different levels of classified data, different categories of workers in an organization (e.g., managers, employees, and consultants), as well as additional categories, for example.

Certain embodiments are directed to a computing method for processing user inputs using multiple virtual machines. The method includes displaying, on a display of a machine, a view of a user application, receiving a first user input to the user application, transferring the first user input from the user application to a first virtual machine for processing the first user input by the first virtual machine, and displaying a first output, from the first virtual machine, in response to the first user input, on the display. The method further includes receiving a second user input to the user application, transferring the second user input from the user application to a second virtual machine for processing the second user input by the second virtual machine, and displaying a second output, from the second virtual machine, in response to the second user input, on the display.

Other embodiments are directed to a computing system that includes an input device, a display, and a controller, coupled to the input device and to the display. The controller is constructed and arranged to output a view of a user application to the display, receive a first user input to the user application via the input device, transfer the first user input from the user application to a first virtual machine for processing the first user input by the first virtual machine, and provide a first output to the display, wherein the first output is from the first virtual machine in response to the first user input. The controller is further constructed and arranged to receive a second user input to the user application via the input device, transfer the second user input from the user application to a second virtual machine for processing the second user input by the second virtual machine, and provide a second output to the display, wherein the second output is from the second virtual machine in response to the second user input.

Still other embodiments are directed to a computer program product that includes a non-transitory computer readable medium. The medium stores instructions which, when executed by a processor, cause the processor to perform a method of processing user inputs using multiple virtual machines. The method includes displaying, on a display of a machine, a view of a user application, receiving a first user input to the user application, transferring the first user input from the user application to a first virtual machine for processing the first user input by the first virtual machine, and displaying a first output, from the first virtual machine, in response to the first user input, on the display. The method further includes receiving a second user input to the user application, transferring the second user input from the user application to a second virtual machine for processing the second user input by the second virtual machine, and displaying a second output, from the second virtual machine, in response to the second user input, on the display.

BRIEF DESCRIPTION OF THE DRAWINGS

The foregoing and other features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention. In the drawings.

DETAILED DESCRIPTION

An improved technique for Red/Green security and other types of processing involving multiple virtual machines employs a presentation layer that receives user inputs, effects transfer different user inputs to different virtual machines for processing, and renders outputs from the different virtual machines in a unified presentation. The presentation layer therefore allows the user to interact with the different virtual machines through a single construct and generally avoids the need for the user to switch between different virtual machines.

Figure 1:
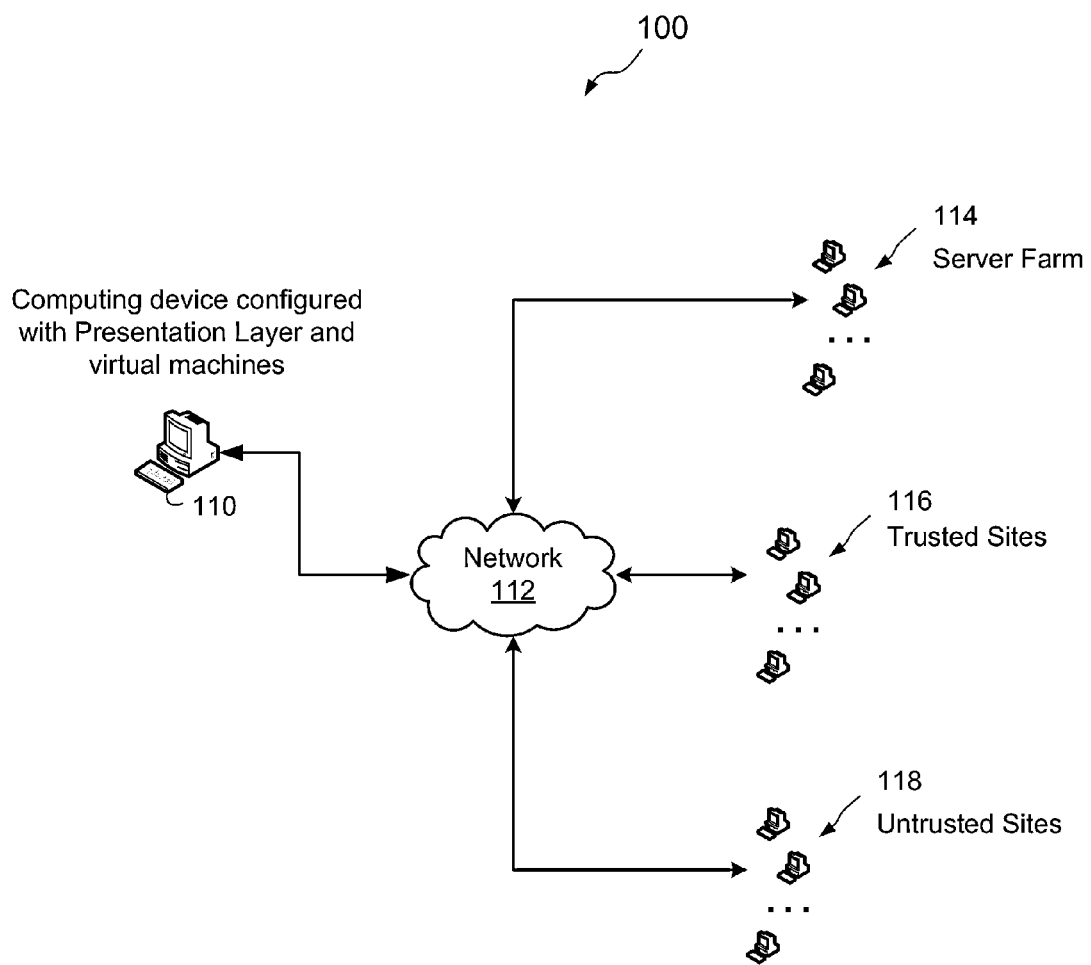
FIG. 1 is a schematic diagram showing an example environment in which Red/Green security employing a presentation layer can be used.

FIG. 1 shows an example system 100 for implementing Red/Green security with virtual machines and a presentation layer. The system 100 includes a computing device 110 configured with a presentation layer. The computing device 110 is connected to a network 112. On the network 112, there can be found a server farm 114, a number of trusted sites 116, and a number of untrusted sites 118.

A user of the computing device 110 can enter inputs to the presentation layer, which are then transferred to different virtual machines. The virtual machines process the inputs and produce outputs. The outputs are transferred back to the presentation layer for display to the user. In some examples, the virtual machines are all run on the computing device 110. In other examples, the virtual machines are located on one or more other computing devices (such as one or more of the servers in the server farm 114) or are distributed among the computing device 110 and other computing devices. When implementing Red/Green security, one of the virtual machines is designated as a Green, or trusted, virtual machine, and another is designated as a Red, or untrusted, virtual machine. The Green virtual machine is then used for trusted activities. These may include responding to user inputs entered in the presentation layer to access trusted sites 116. The Red machine is used for untrusted activities. These may include responding to user inputs entered in the presentation layer to access untrusted sites 118.

In some examples, the computing device 110 is a server equipped with a unifying presentation layer; however, it can be any type of computing device equipped with a presentation layer, such as a desktop computer, workstation, laptop computer, tablet computer, smart phone, PDA, gaming console, or set-top box, for example. The network 112 can be any type of network, such as a the Internet, a local area network, a wide area network, a satellite network, a telephone network, a cable television network, a virtual network, or a combination of any of the above, for example. The sites 116 and 118 can be any type of sites, such as websites, FTP sites, other types of sites, or other machines (physical or virtual) on the network 112.

Figure 2:
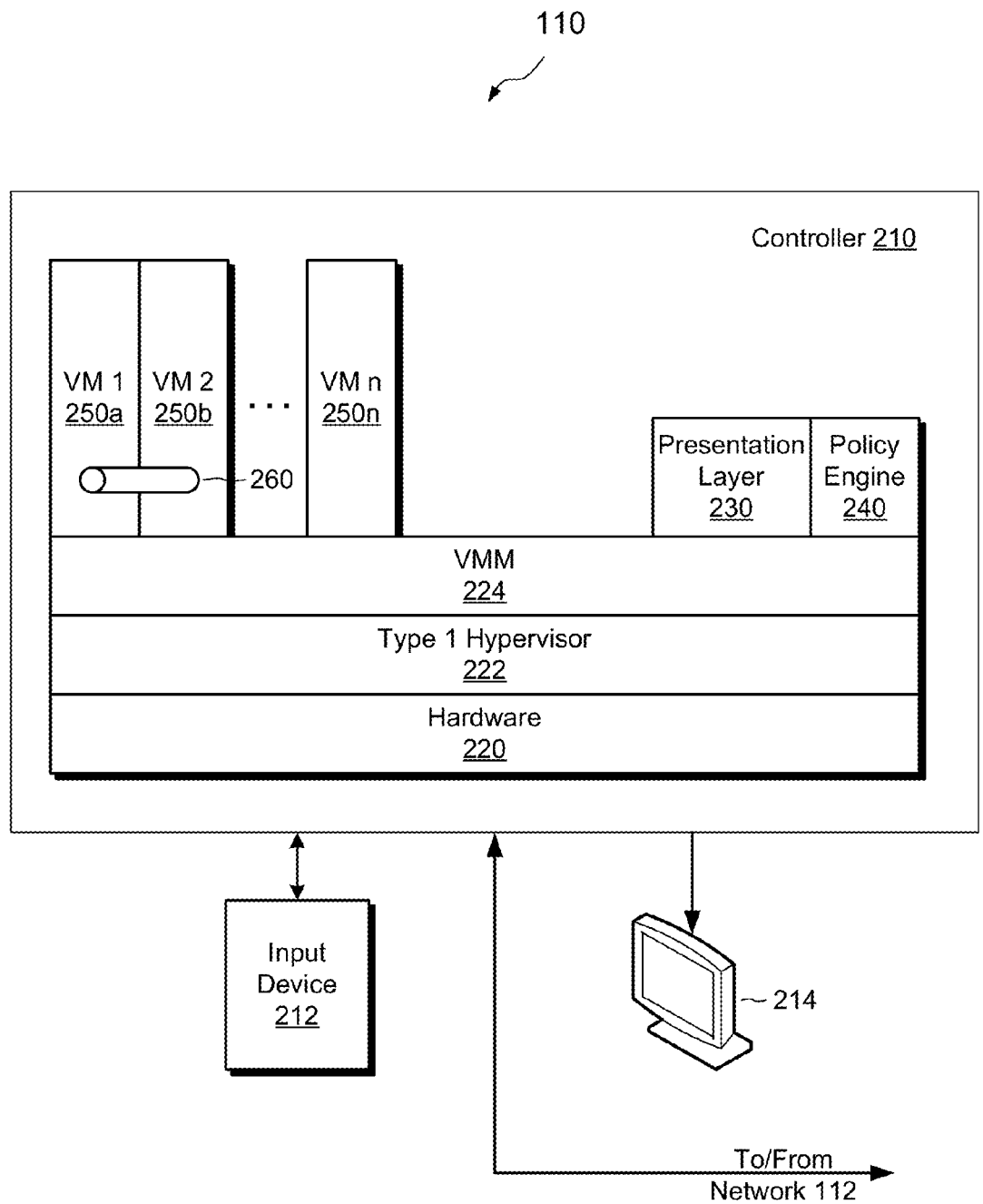
FIG. 2 is a block diagram showing an example computing device for implementing Red/Green security.

FIG. 2 shows an example hardware and software structure of the computing device 110. As shown, the computing device 110 includes a controller 210, an input device 212, and a display 214. The controller 210 includes hardware 220, such as one or more processor chips, memory, I/O ports, and auxiliary circuits. The controller 210 also includes a Type 1 hypervisor 222, a virtual memory manager (VMM) 224, a presentation layer 230, a policy engine 240, multiple virtual machines 250a-n, and an airlock 260.

The input device 212 can be any device or devices for receiving user input, such as a keyboard, a pointer device, a touch pad, a touch screen, or any combination of these items, for example. The display 214 can be any device or devices for providing an observable output, such as a CRT display, LCD display, LED display, plasma display, projector, or Braille display, for example. The controller 210, input device 212, and display 214 can be provided as separate components. Alternatively, they can be integrated into a single unit or multiple units.

The Type 1 hypervisor 222 is a software construct that operates as a hardware abstraction layer. The Type 1 hypervisor 222 runs directly on the hardware 220 and permits multiple virtual machines to be run on the controller 210. Alternatively, a Type 2 or other type of hypervisor can be used, or the hypervisor 222 can be omitted altogether. Hypervisors can help to improve security of the virtual machines 250a-250n, however, and are well suited for Red/Green computing environments.

The VMM 224 is a software construct that operates in coordination with the hypervisor 222. The VMM 224 manages system memory by different virtual machines and manages the creation and destruction of virtual machines on the controller 210. The hardware 220, hypervisor 222, and VMM 224 are commercially available elements known to those skilled in the art.

The presentation layer 230 provides an interface to the user. The presentation layer 230 receives user inputs, transfers user inputs to the virtual machines 250a-250n, receives outputs from the virtual machines 250a-250n, and renders the outputs for display to the user. The presentation layer 230 therefore unifies operations of the different virtual machines 250a-250n by providing a common interface to the virtual machines, in effect, making the user experience more similar to that of interacting with a single machine.

In one example, the presentation layer 230 is implemented as a service virtual machine (i.e., a "service VM") that runs a guest operating system, such as the Windows™ operating system, available from Microsoft, Inc. of Redmond, Wash. Other operating systems can be used, such as Unix, Red Hat Linux, or Mac OSX, for example.

In another example, the presentation layer 230 is configured to run parts of an operating system rather than a full installation. These parts may include, for example, software constructs for rendering the desktop and receiving user input, and software constructs for running applications.

In addition, certain user applications can be installed on the presentation layer 230. These can include a browser or an email program, for example. The user applications are preferably specially tailored to coordinate with the presentation layer 230. For example, a browser application installed on the presentation layer 230 can be configured not to visit web pages itself, but rather to pass Uniform Resource Locators (URLs) input by users to the virtual machines 250a-250n. The virtual machines 250a-250n then receive the URLs, visit the identified sites (using their own browser applications), download content from the sites, and send the content back to the presentation layer 230 for display to the user. The content can be displayed within the application view or elsewhere on the display 214.

In some examples, tailored user applications are highly simplified. For instance, a simplified browser application can include in its application view merely a field for entering a URL. Output from the virtual machines 250a-250n can be shown within a display space of the simplified application (if a display space is provided) or elsewhere on the display 214.

In one example, the presentation layer 230 renders output from the virtual machines 250a-250n as views of the virtual machines' desktops, or portions thereof. Outputs of the virtual machines can then be viewed within the presentation layer 230 on the display 214 as they would appear on the virtual machines directly.

The presentation layer 230 can be configured to support multiple user applications, such as email programs, browsers, and client-server programs, for example. A tailored version or a simplified version can be provided for each user application.

The presentation layer 230 preferably operates in close coordination with the policy engine 240. The policy engine 240 is a software construct that assigns user inputs provided to the presentation layer 230 to the virtual machines 250a-250n. The policy engine 240 operates based on a predetermined policy, which can be expressed as a set of criteria. These criteria typically relate to user-entered input, as well as to other factors, such as the identity of the user, the system environment, or other factors. It is understood that the policy implemented by the policy engine 240 can cover a wide range of criteria. Different policies can be implemented for different users or different organizations.

During operation, the policy engine 240 receives user input from the presentation layer 230. Each user input specifies a computing action to be performed. Computing actions can relate to any computing activity; however, typical computing actions include directions to go to a web site, get email, and copy a file from the network. Once the policy engine 240 receives a user input, the policy engine 240 performs a series of tests, based on the set of criteria, to determine which of the virtual machines 250a-250n should be selected to process the user input. The policy engine 240 then selects a virtual machine and directs the user input to the selected machine. The policy engine 240 preferably makes its selection of virtual machine automatically and transparently to the user. In some examples, the policy engine 240 can select no virtual machine in response to a user input, if the specified computing action is not allowed by the policy for any category of virtual machine.

When implementing Red/Green security, one virtual machine (e.g., 250a) is designated as Green, and another virtual machine (e.g., 250b) is designated as Red. The policy engine 240 then performs a series of tests, based on a set of criteria, to determine whether the computing action specified by the user input is trusted (Green) or untrusted (Red). If the policy engine 240 determines that the action is trusted, the user input is sent to the Green virtual machine for processing. If the policy engine 240 determines that the action is not trusted, the user input is typically sent to the Red virtual machine. The user input may not be sent to any machine if its specified action is forbidden by the policy for any machine.

In one example, the policy engine 240 is implemented as a service VM running a host operating system such as Microsoft Windows. Other operating systems can be used, such as Unix, Red Hat Linux, or Mac OSX, for example. The policy engine 240 is preferably persistent, so that it is maintained intact for different user sessions and after power cycling of the computing device 110.

The policy engine 240 can obtain its policy locally (i.e., the policy criteria are stored entirely within the computing device 110). The policy engine 240 can also obtain its criteria remotely, such as from another computer on the network 112. For example, the administrator of the computing device 110 may subscribe to a service that provides security criteria that the policy engine 240 can apply. Alternatively, the policy engine 240 can connect to a server for obtaining policy criteria applicable to an organization (such as a corporate security policy). In some instances, the policy engine 240 can store some criteria locally and obtain other criteria remotely.

In an example, the policy engine 240 also works in coordination with the VMM 224 to direct the creation and destruction of the virtual machines 250*a*-250*n*. For instance, the policy engine 240 can direct the VMM 224 to create a new Green virtual machine if no Green machine is currently running and a trusted computing action is specified. The policy engine 240 can also direct the VMM 224 to create a new Red virtual machine if no Red virtual machine is currently running and an untrusted computing action is specified. The policy engine 240 can further direct the VMM 224 to destroy any of the virtual machines 250*a*-250*n*. A virtual machine is typically destroyed if it has been idle for a period of time, or if a virus or some other threat has been detected on the virtual machine.

The virtual machines 250*a*-250*n* are each configured to run an instance of an operating system, such as the Windows operating system, although other operating systems can be used. In an example, the virtual machines 250*a*-250*n* are isolated from one another, so that direct communication or transfer of data between virtual machines is prohibited. Each virtual machine 250*a*-250*n* runs in its own container that encapsulates virtual hardware resources and user applications. Each of the virtual machines 250*a*-250*n* is connected to its own virtual network, and the virtual networks of the different virtual machines are isolated from one another.

The virtual machines 250*a*-250*n* are preferably volatile (i.e., not persistent). Rather, the virtual machines 250*a*-250*n* are created as needed, on demand, and are destroyed when they are no longer needed, or when they pose a security risk.

Although only two virtual machines are typically used for Red/Green security, additional virtual machines can be provided for handling other classifications of computing actions or other users of the computing device 110. Any number of virtual machines 250*a*-250*n* can be provided, limited only by the hardware constraints of the computing device 110.

Although the virtual machines 250*a*-250*n* are preferably run in separate containers and on separate virtual networks that do not directly exchange data, it is possible, under some circumstances, for a user to move data from one virtual machine to another. Airlock 260 depicts this type of user-initiated transfer. The airlock 260 as shown is typically not a software component of the controller 210, but rather a process whereby a user can copy information from one virtual machine to another. Transfer of information can occur, for example, when a user copies information provided from one virtual machine (e.g., Green or Red) and attempts to paste the information into another virtual machine. The information can be in any form, such as text, files, or folders, for example. In response to the user initiating the "paste" command, the policy engine 240 is invoked. The policy engine 240 subjects the copied information to a set of policy tests based on its predetermined criteria. The policy engine 240 allows the pasting operation to proceed if the criteria allow transfer of the copied information (e.g., if none of the policy tests identify a policy violation). However, the policy engine 240 prohibits the information from being pasted if the criteria indicate a policy violation (e.g., if any of the policy tests identify a violation).

It should be noted that the airlock 260 itself confers a significant advance in Red/Green, virtual machine implementations. Some prior implementations provide mechanisms for transferring data between Red and Green virtual machines, but they do not first verify that the data to be transferred is allowed to cross the Red/Green barrier. These prior mechanisms thus introduce a security risk, as they can allow Red and Green content to be intermingled. However the presence of the airlock 260, which distinguishes trusted content from untrusted content and blocks untrusted content eliminates this security risk and promotes enhanced security.

In the arrangement described, the controller 210 is implemented using the hardware 220 (such as one or more processor chips, memory, I/O ports, and auxiliary circuits), which runs software constructs, and thereby forms a specialized circuit when executing the hypervisor 222, VMM 224, presentation layer 230, policy engine 240, and virtual machines 250*a*-250*n*. In other arrangements, the hypervisor 222, VMM 224, presentation layer 230, policy engine 240, and virtual machines 250*a*-250*n* are implemented using one or more Application-Specific Integrated Circuits (ASICs), Field-Programmable Gate Arrays (FPGAs), or other types of circuits.

Figure 3:
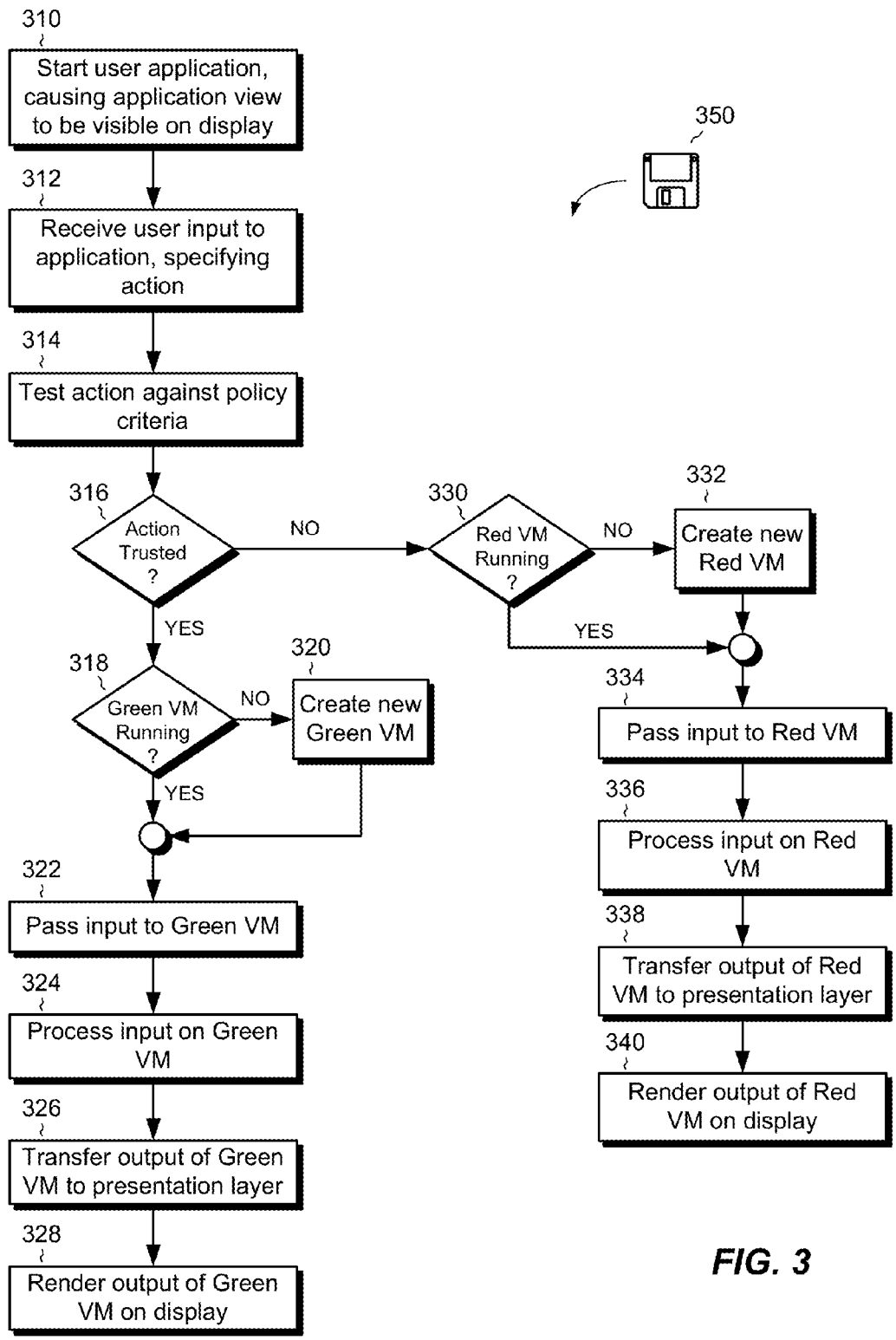
FIG. 3 is a block diagram showing an example process for conducting Red/Green security using the computing device of FIG. 2.

FIG. 3 shows an example process for implementing Red/Green security using the arrangement of FIG. 2. At step 310, a user starts a user application within the presentation layer 230, causing a view of the application to be made visible on the display 214.

At step 312, the user application running on the presentation layer 230 receives a user input. Typically, input is received from the user via input device 212. For example, the user can enter text or other keystrokes and press "enter" or provide some other confirmation of input. Alternatively, the user may user a pointer to click a link or a certain region of the application view. The user input specifies a computing action to be performed.

At step 314, the policy engine 240 is invoked and the specified computing action is tested against a set of policy criteria. The policy criteria include criteria related to the specified computing action. The policy criteria can also include criteria related to other factors, such as the identity of the user, the user environment, or corporate policies, for example.

If the policy engine 240 determines that the action is trusted (step 316) then the controller 210 checks whether a Green virtual machine is already running (step 318). If a Green virtual machine is running, the user input is passed to the running Green virtual machine (step 322). Otherwise, a new Green virtual machine is created (step 320) and the user input is passed to the newly created Green virtual machine (step 322). The green virtual machine then processes the input (step 324). Output from the green virtual machine, which is produced by the Green virtual machine in response to the user input, is transferred to the presentation layer 230 (step 326) for display to the user (step 328).

Returning to step 316, if the policy engine 340 determines that the action specified by the user input is not trusted, the controller 210 checks whether a Red virtual machine is already running (step 330). If a Red machine is running, the user input is passed to the running Red machine (step 334). Otherwise, a new Red virtual machine is created (step 322). The user input is then passed to the newly created Red virtual machine (step 334). The Red virtual machine then processes the user input (step 336). Output of the red virtual machine, which the Red virtual machine produces in response to the user input, is then transferred to the presentation layer 230 (step 338) for display to the user (step 340).

Figure 4A:
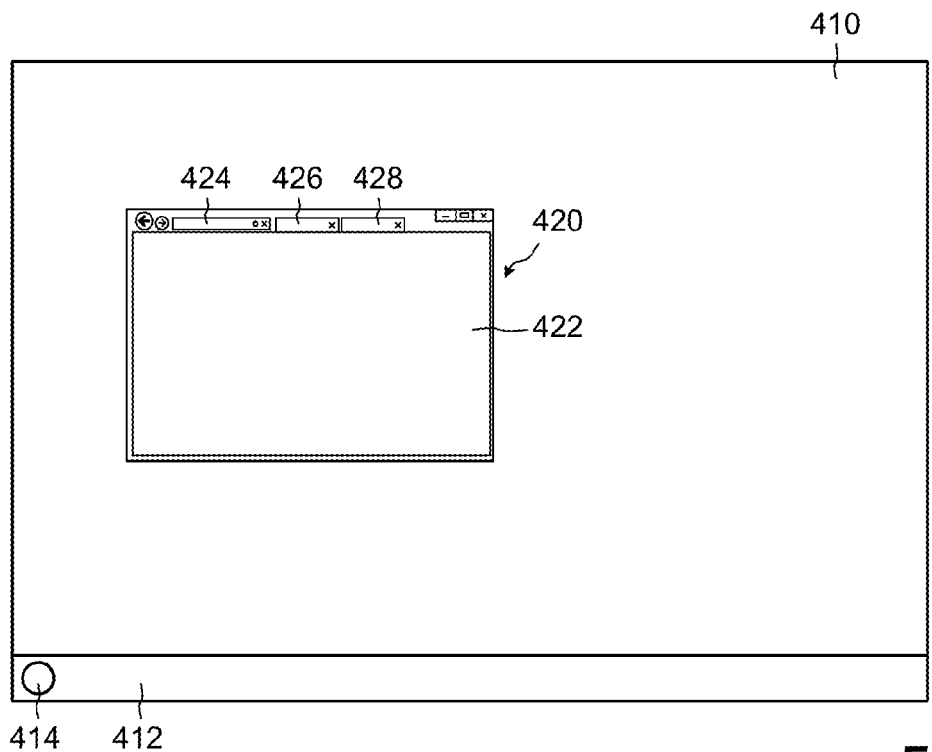
FIGS. 4a and 4b are simplified example screen renderings produced by the presentation layer running on the computing device of FIG. 2.
Figure 4B:
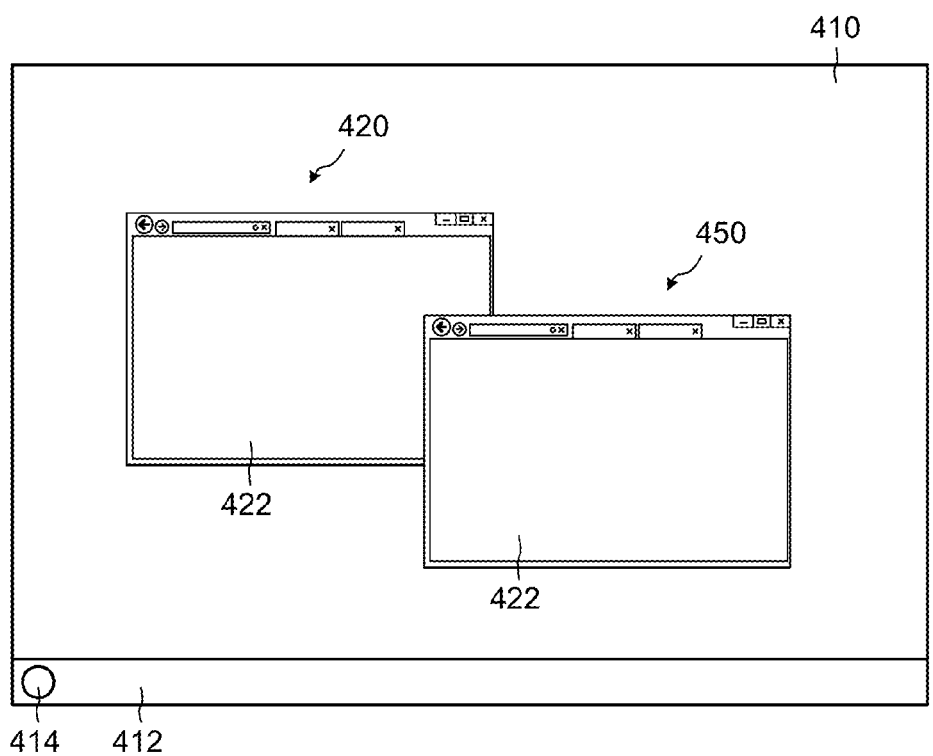

FIGS. 4*a* and 4*b* show simplified example screen views as rendered by the presentation layer 230 and shown on the display 214 during the process of FIG. 3. In the example of FIGS. 4*a* and 4*b*, the user application is a browser.

FIG. 4a shows a Windows desktop 410, which is rendered by the presentation layer 230 and shown in the display 214. The desktop 410 includes a taskbar 412 and a "Start" button 414. In an example, the screen view is the desktop of the presentation layer 230 (which itself can be implemented as a virtual machine). The desktop 410 also includes a view of a user application 420. In one example, the application view 420 is produced by a specially tailored version of a browser application running on the presentation layer 230. The application view 420 includes a display region 422 for displaying browser output, a field 424 for receiving URLs as input, and browser tabs 426 and 428. By selecting different browser tabs 426 or 428, the user can cause the contents of different pages to be displayed in the display region 422. The view shown in FIG. 4a depicts the state of the display 214 after the execution of step 310 of FIG. 3.

From this state, the user can enter a desired URL into the URL field 424 and press "Enter" on a keyboard of the input device 212. In response to entry of the URL (a user input), the policy engine 240 selects one of the virtual machines 250a-250n. It may alternatively create a new virtual machine if none of the desired type is running. A browser is run on the selected (or newly created) virtual machine, and the browser running on the virtual machine is directed to visit the web page specified by the URL. Contents of the web page are transferred back to the presentation layer 230 and displayed in the display region 422 of the application view 420 for one of the tabs (e.g., tab 426).

When the user then enters another URL, the policy engine 240 again selects (or creates) a virtual machine. If the same virtual machine is selected as for the initial URL, output from the selected virtual machine may be displayed in the display region 422 of the same tab (e.g., tab 426). However, if a different virtual machine is selected (or created), output from the different virtual machine may be displayed elsewhere, such as in the display region 422 of the tab 428.

In an example, when implementing Red/Green security, the first URL entered by the user can be processed by a Green virtual machine and the second URL can be processed by Red virtual machine, or vice-versa. Displaying the contents of the Red and Green virtual machines in different browser tabs helps to enforce isolation of trusted content from untrusted content, such that transfer of data from one virtual machine to another can be readily detected and processed by the airlock 260. Separation of output of different virtual machines in different display regions is not strictly required, however.

FIG. 4b shows another implementation, where the outputs of different virtual machines are provided in different user application windows. A first window is displayed in application view 420, and a second window is displayed in application view 450. One window can be used to present Green content, whereas the other can be used to present Red content. Providing different browser windows further helps to promote isolation between trusted and untrusted content.

In some examples, corporate or other policies may prohibit Green content and Red content from appearing together on the same display at the same time. For example, if the presentation layer 230 is displaying Green content, the presentation layer 230 may be prohibited from also displaying Red content. In these instances, the policy engine 240 can be configured to display a message to the user, requiring the user to close the window displaying Green content before it allows Red content to be displayed. The policy engine 240 confirms closure of the application program displaying Green content before starting a new instance of the user application that displays Red content. The policy engine 240 can operate in an analogous fashion when the presentation layer 230 is displaying Red content. The policy engine 240 displays a message to the user requiring the user to close the window displaying Red content, confirms that the window displaying Red content has been closed, and then starts a new browser instance displaying Green content.

As shown and described, a technique for processing user inputs using multiple virtual machines employs a presentation layer that operates to receive user inputs for processing on different virtual machines and to render outputs from the virtual machines for display to the user. The technique thus provides a unified interface to multiple virtual machines and reduces the inconvenience and confusion that results from requiring users to switch manually between different virtual machine desktops.

While various embodiments of the invention have been particularly shown and described, it will be understood by those skilled in the art that various changes in form and details may be made therein.

For example, although the controller 210 is shown and described as including a single policy engine 240, it may alternatively include multiple policy engines. The different policy engines may be used together (e.g., their respective criteria can be combined), or one policy engine may be selected for use whereas the others are ignored. According to another variant, the different policy engines are used together, and a hierarchy is established among the policy engines. The hierarchy ensures that, in the event of a conflict between policies, certain policies take precedence over others.

Also, although the virtual machines 250a-250n are shown and described as being part of the controller 210, this is merely an example. Some or all of the virtual machines may be run on hardware separate from the controller 210, such as on one or more other physical machines in a server farm. There is no need for the virtual machines 250a-250n to be bound to any particular physical machine or machines.

Also, the techniques disclosed herein may be embodied as a computer-readable storage medium, such as a magnetic disk, magnetic tape, compact disk, DVD, optical disk, flash memory, Application Specific Integrated Circuit (ASIC), Field Programmable Gate Array (FPGA), and the like. See, for example, the medium 350 shown in FIG. 3. Multiple computer-readable media may be used. The medium (or media) may be encoded with instructions which, when executed on one or more computers or other processors, perform methods that implement the various embodiments described above. Such medium (or media) may be considered an article of manufacture or a machine, and may be transportable from one machine to another.

Various aspects of above-described embodiments may be used alone, in combination, or in a variety of arrangements not specifically set forth in the foregoing. For example, aspects described in one embodiment may be combined in any manner with aspects described in other embodiments. Also, the various methods or processes outlined herein may be encoded as software. The software may be written using any of a number of suitable programming languages and/or programming or scripting tools.

Those skilled in the art will therefore understand that various changes in form and detail may be made to the embodiments disclosed herein without departing from the spirit and scope of the invention as defined by the appended claims.

What is claimed is:

1. A computing method for processing user inputs from a user using multiple virtual machines, comprising:
designating a first virtual machine for processing a first category of computing actions;

designating a second virtual machine for processing a second category of computing actions;

displaying, on a display of a machine, a view of a user application;

receiving, from the user, a first user input to the user application, the first user input specifying a first computing action to be performed;

testing whether the computing action specified by the first user input falls within the first category of computing actions or falls within the second category of computing actions;

transferring the first user input from the user application to the first virtual machine for processing the first user input by the first virtual machine, in response to testing indicating that the computing action specified by the first user input falls within the first category of computing actions;

displaying a first output, from the first virtual machine, in response to the first user input, on the display;

receiving, from the user, a second user input to the user application, the second user input specifying a second computing action to be performed;

testing whether the computing action specified by the second user input falls within the first category of computing actions or falls within the second category of computing actions;

transferring the second user input from the user application to the second virtual machine for processing the second user input by the second virtual machine, in response to testing indicating that the computing action specified by the second user input falls within the second category of computing actions; and displaying a second output, from the second virtual machine, in response to the second user input, on the display, wherein the method further comprises:
receiving a direction from the user to copy information on one of the first virtual machine and the second virtual machine;
receiving a direction from the user to paste the copied information into the other of the first virtual machine and the second virtual machine;
executing a set of policy tests on the copied information; and
prohibiting pasting of the copied information into the other of the first virtual machine and the second virtual machine when the set of policy tests prohibits the copied information from entering the other of the first virtual machine and the second virtual machine.

2. The computing method of claim 1,
wherein the act of displaying the first output includes rendering the first output on one of (i) the view of the user application on the display or (ii) a view of another instance of the user application on the display; and
wherein the act of displaying the second output includes rendering the second output on one of (i) the view of the user application on the display or (ii) a view of another instance of the user application on the display.

3. The computing method of claim 1, further comprising:
receiving additional user inputs from the user;
testing, responsive to the user application receiving each of the additional user inputs, whether the computing action specified by the respective user input falls within the first category or falls within the second category; and
directing the first virtual machine to process the computing action specified by the respective user input when the computing action falls within the first category, or directing the second virtual machine to process the computing action specified by the respective user input when the computing action falls within the second category.

4. The computing method of claim 1, wherein the acts of receiving the first user input and receiving the second user input are performed by a service virtual machine.

5. The computing method of claim 1, further comprising implementing a trusted/untrusted security policy, wherein the first virtual machines is designated as a trusted virtual machine and the second virtual machine is designated as an untrusted virtual machine.

6. The computing method of claim 5, wherein the first virtual machine and the second virtual machine are provided in separate, isolated containers.

7. The computing method of claim 5, further comprising destroying at least one of the first virtual machine and second virtual machine after a period of inactivity of the respective virtual machine.

8. The computing method of claim 5, further comprising destroying at least one of the first virtual machine and the second virtual machine in response to a detected security threat on the respective virtual machine.

9. The computing method of claim 5, further comprising creating a new untrusted virtual machine in response to the user application receiving an input specifying an untrusted computer action to be performed.

10. The computing method of claim 5, further comprising creating a new trusted virtual machine in response to the user application receiving an input specifying a trusted computing action to be performed.

11. The computing method of claim 5, further comprising:
receiving a second direction from the user to copy second information on one of the first virtual machine and the second virtual machine;
receiving a second direction from the user to paste the copied second information into the other of the first virtual machine and the second virtual machine;
executing the set of policy tests on the copied second information; and
pasting the copied second information into the other of the first virtual machine and the second virtual machine when the set of policy tests does not prohibit the copied second information from entering the other of the first virtual machine and the second virtual machine.

12. The computing method of claim 5, wherein the user application is a browser displaying output from one of the first virtual machine and the second virtual machine, wherein a user input is received that specifies a computing action to be performed by the other of the first virtual machine and the second virtual machine, and wherein the computing method further comprises at least one of:
(i) opening a new browser window on the display and displaying, within the new browser window, output from the other of the first virtual machine and the second virtual machine;
(ii) opening a new browser tab on the browser and displaying, within the new browser tab, output from the other of the first virtual machine and the second virtual machine; or
(iii) displaying a message instructing a user to close the browser before proceeding, confirming that the browser has been closed, starting a new browser instance, and displaying, within the new browser instance, output provided by the other of the first virtual machine and the second virtual machine.

13. The computing method of claim 5, further comprising running the first virtual machine on a first physical machine and running the second virtual machine on a second physical machine, the second physical machine being is physically separate from the first physical machine.

14. The computing method of claim 1, further comprising:
receiving, from the user by the user application, a third user input specifying a computing action to be performed;
testing, by a policy engine in response to the user application receiving the third user input, whether the computing action specified by the third user input falls within the first category of computing actions; and
directing, by the policy engine, the first virtual machine to process the computing action specified by the third user input when the testing indicates that the computing action falls within the first category of computing actions.

15. The computing method of claim 14, further comprising:
receiving, from the user by the user application, a fourth user input specifying a computing action to be performed;
testing, by the policy engine in response to the user application receiving the fourth user input, whether the computing action specified by the fourth user input falls within the second category of computing actions; and
directing, by the policy engine, the second virtual machine to process the computing action specified by the fourth user input when the testing indicates that the computing action falls within the second category of computing actions.

16. The computing method of claim 14, further comprising:
running a presentation layer to generate the view of the user application, including presenting a graphical user interface (GUI) for receiving user input and providing user output;
running a first instance of the user application on the first virtual machine to process the first user input, the first instance of the user application receiving the first user input from the view of the user application and processing the first user input to produce the first output; and
running a second instance of the user application on the second virtual machine to process the second user input, the second instance of the user application receiving the second user input from the view of the user application and processing the second user input to produce the second output.

17. The computing method of claim 16, wherein the first instance of the user application running on the first virtual machine and the second instance of the user application running on the second virtual machine are instances of a software program, the software program being one of a browser, an email program, or a client-server program, and wherein the view of the user application running in the presentation layer is a simplified version of the software program.

18. A computing system, comprising:
an input device;
a display; and
a controller, coupled to the input device and to the display, the controller constructed and arranged to:
designate a first virtual machine for processing a first category of computing actions;
designate a second virtual machine for processing a second category of computing actions;
output a view of a user application to the display;
receive, from a user, a first user input to the user application via the input device, the first user input specifying a first computing action to be performed;
test whether the computing action specified by the first user input falls within the first category of computing actions or falls within the second category of computing actions;
transfer the first user input from the user application to the first virtual machine for processing the first user input by the first virtual machine in response to testing indicating that the computing action specified by the first user input falls within the first category of computing actions;
provide a first output to the display, wherein the first output is from the first virtual machine in response to the first user input;
receive, from the user, a second user input to the user application via the input device, the second user input specifying a second computing action to be performed;
test whether the computing action specified by the second user input falls within the first category of computing actions or falls within the second category of computing actions;
transfer the second user input from the user application to the second virtual machine for processing the second user input by the second virtual machine in response to testing indicating that the computing action specified by the second user input falls within the second category of computing actions; and
provide a second output to the display, wherein the second output is from the second virtual machine in response to the second user input,
wherein the controller is further constructed and arranged to:
receive a direction from the user to copy information on one of the first virtual machine and the second virtual machine;
receive a direction from the user to paste the copied information into the other of the first virtual machine and the second virtual machine;
execute a set of policy tests on the copied information; and
paste the copied information into the other of the first virtual machine and the second virtual machine when the set of policy tests does not prohibit the copied information from entering the other of the first virtual machine and the second virtual machine.

19. The computing system of claim 18, wherein the controller is further constructed and arranged to:
receive additional user inputs from the user;
test, responsive to the user application receiving each of the additional user inputs, whether the computing action specified by the respective user input falls within the first category or falls within the second category; and
direct the first virtual machine to process the computing action specified by the respective user input when the computing action falls within the first category, or direct the second virtual machine to process the computing action specified by the respective user input when the computing action falls within the second category.

20. The computing system of claim 19, wherein the controller is further constructed and arranged to implement a trusted/untrusted security policy, wherein the first category includes trusted computing actions and the second category includes untrusted computing actions, and wherein computing actions in the first category are performed by the first virtual machine and computing actions in the second category are performed by the second virtual machine.

21. A computer program product that includes a non-transitory computer readable medium that stores instructions which, when executed by a processor, cause the processor to perform a method of processing user inputs from a user using multiple virtual machines, the method comprising:
  designating a first virtual machine for processing a first category of computing actions;
  designating a second virtual machine for processing a second category of computing actions;
  displaying, on a display of a machine, a view of a user application;
  receiving, from the user, a first user input to the user application, the first user input specifying a first computing action to be performed;
  testing whether the computing action specified by the first user input falls within the first category of computing actions or falls within the second category of computing actions;
  transferring the first user input from the user application to the first virtual machine for processing the first user input by the first virtual machine in response to testing indicating that the computing action specified by the first user input falls within the first category of computing actions;
  displaying a first output, from the first virtual machine, in response to the first user input, on the display;
  receiving, from the user, a second user input to the user application, the second user input specifying a second computing action to be performed;
  testing whether the computing action specified by the second user input falls within the first category of computing actions or falls within the second category of computing actions;
  transferring the second user input from the user application to the second virtual machine for processing the second user input by the second virtual machine in response to testing indicating that the computing action specified by the second user input falls within the second category of computing actions; and
  displaying a second output, from the second virtual machine, in response to the second user input, on the display,
  wherein the method further comprises:
    receiving a direction from the user to copy information on one of the first virtual machine and the second virtual machine;
    receiving a direction from the user to paste the copied information into the other of the first virtual machine and the second virtual machine;
    executing a set of policy tests on the copied information; and
    prohibiting pasting of the copied information into the other of the first virtual machine and the second virtual machine when the set of policy tests prohibits the copied information from entering the other of the first virtual machine and the second virtual machine.

22. The computing method of claim 21, wherein the first virtual machine is a trusted virtual machine and the second virtual machine is an untrusted virtual machine, and wherein the act of testing whether the computing action specified by the first user input falls within the first category of computing actions or falls within the second category of computing actions determines whether the computing action to be performed is trusted or untrusted.

* * * * *